No. 609,819. Patented Aug. 30, 1898.
J. LAWRENCE.
BED.
(Application filed Aug. 7, 1897.)
(No Model.) 5 Sheets—Sheet 1.

WITNESSES:

INVENTOR
John Lawrence
BY
Edgar Tate & C
ATTORNEYS.

No. 609,819. Patented Aug. 30, 1898.
J. LAWRENCE.
BED.
(Application filed Aug. 7, 1897.)
(No Model.) 5 Sheets—Sheet 2.
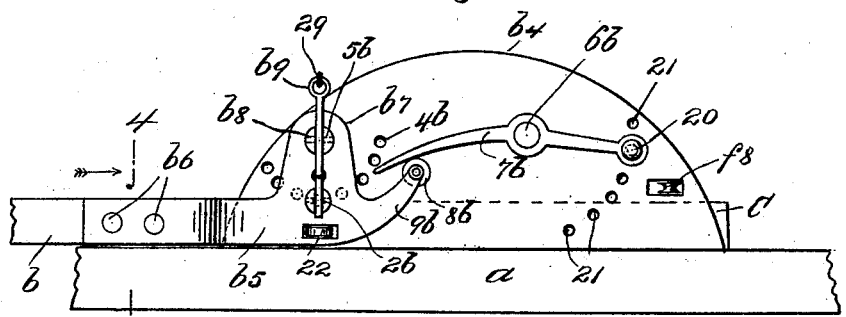
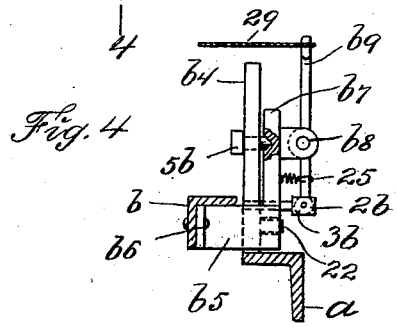
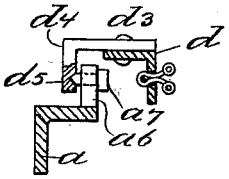
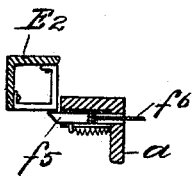
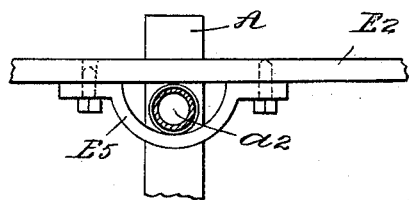
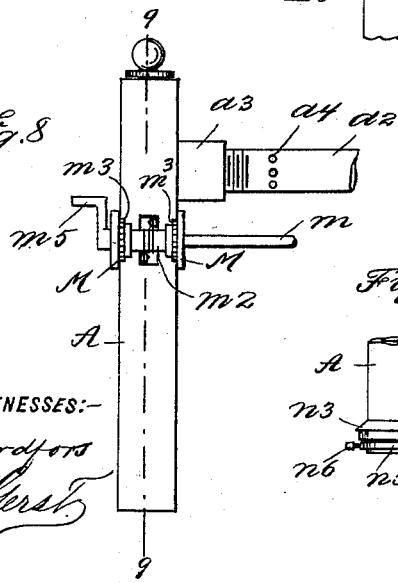
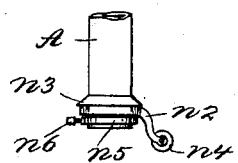
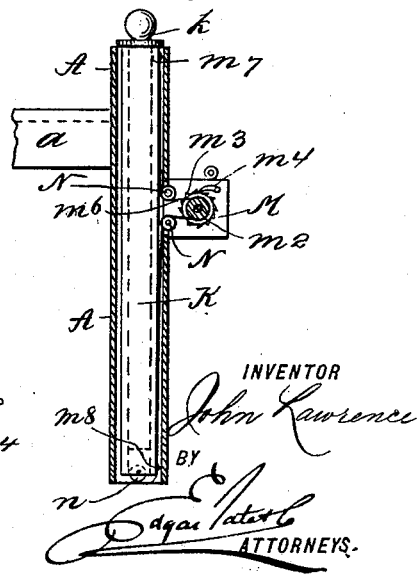
WITNESSES:
INVENTOR
John Lawrence
BY
Edgar Tate
ATTORNEYS.

No. 609,819. Patented Aug. 30, 1898.
J. LAWRENCE.
BED.
(Application filed Aug. 7, 1897.)
(No Model.) 5 Sheets—Sheet 3.
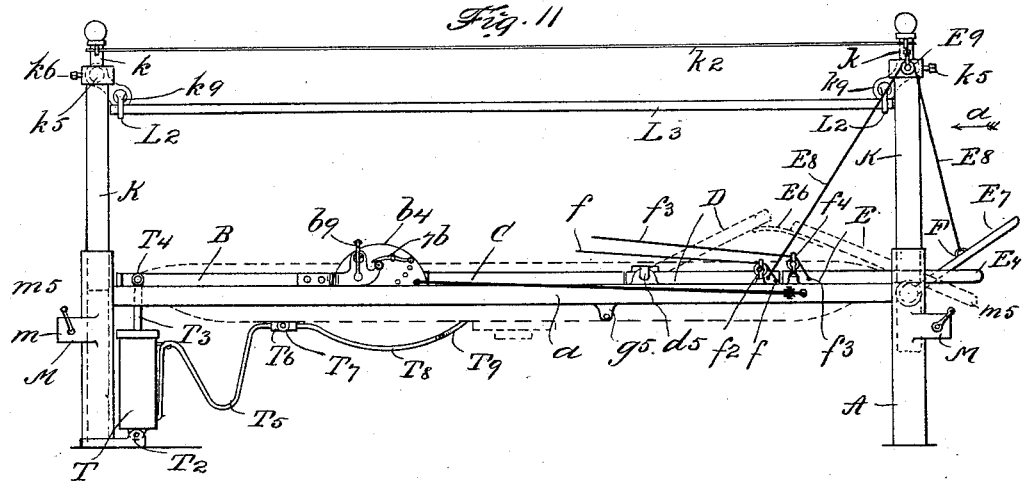
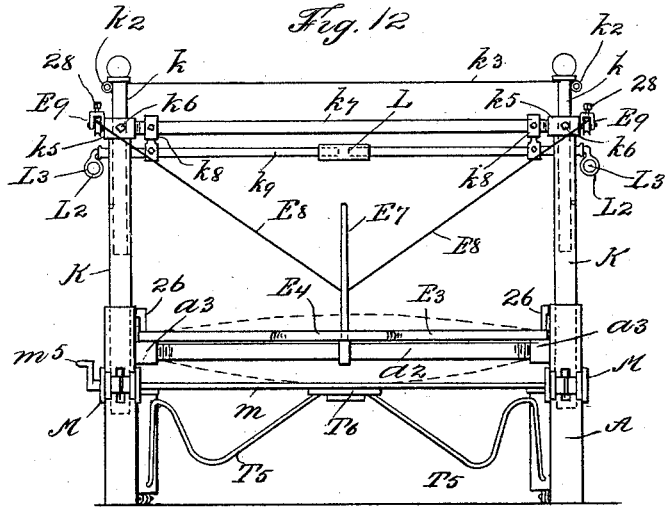
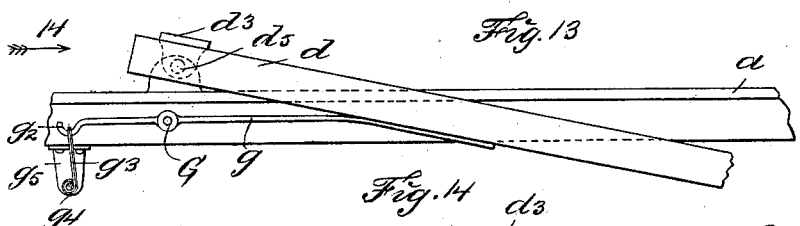
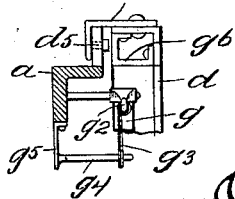

No. 609,819. Patented Aug. 30, 1898.
J. LAWRENCE.
BED.
(Application filed Aug. 7, 1897.)
(No Model.) 5 Sheets—Sheet 4.
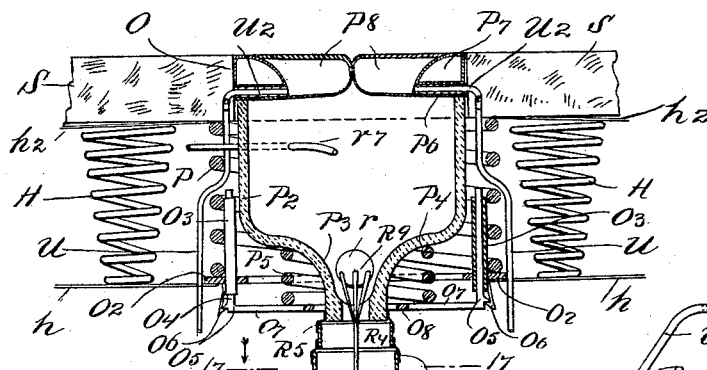
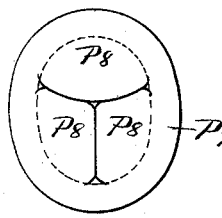
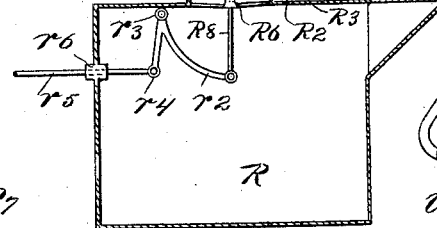
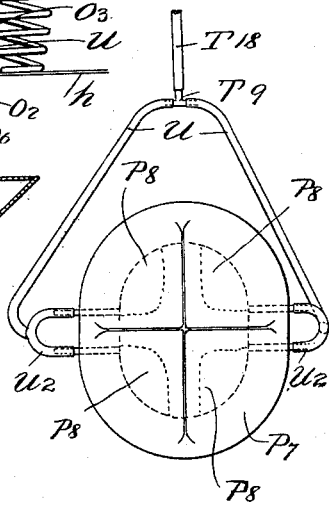
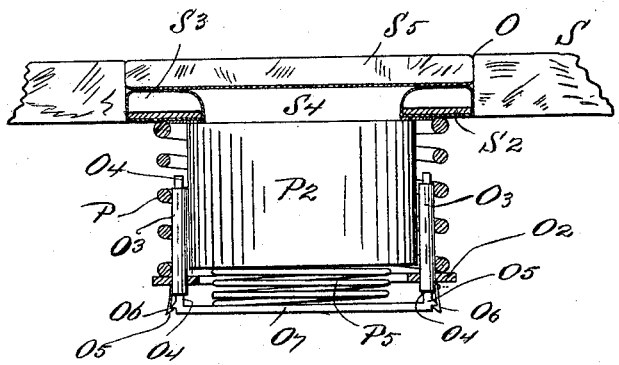
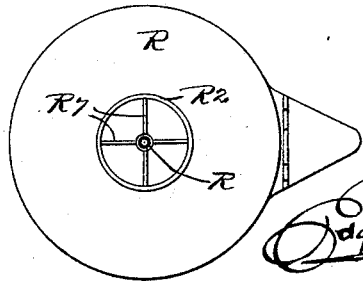
WITNESSES:
INVENTOR
John Lawrence.
BY
ATTORNEYS.

No. 609,819. Patented Aug. 30, 1898.
J. LAWRENCE.
BED.
(Application filed Aug. 7, 1897.)
(No Model.) 5 Sheets—Sheet 5.
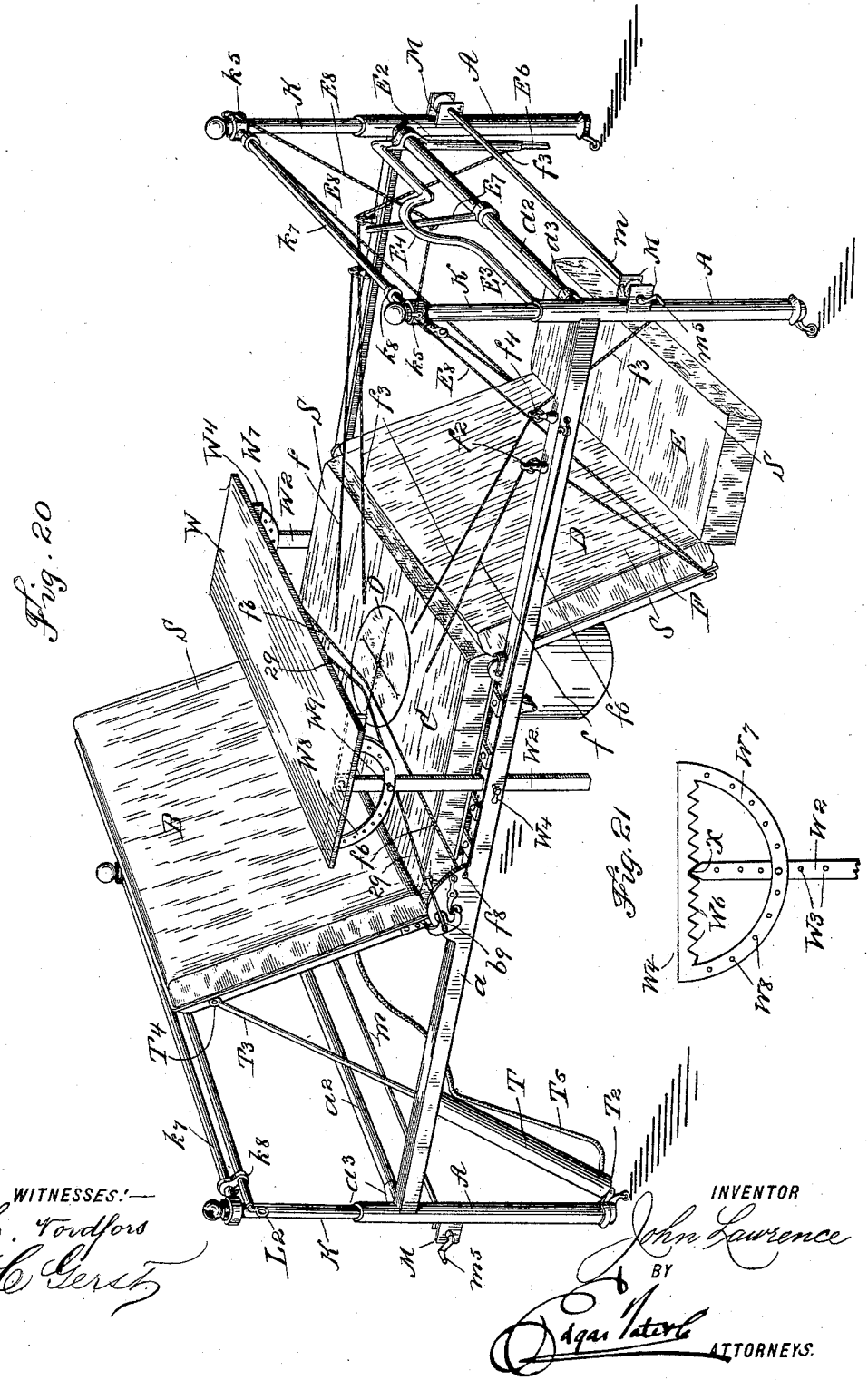
WITNESSES:
INVENTOR
John Lawrence
BY
Edgar Tate
ATTORNEYS.

UNITED STATES PATENT OFFICE.

JOHN LAWRENCE, OF COLUMBUS, OHIO.

BED.

SPECIFICATION forming part of Letters Patent No. 609,819, dated August 30, 1898.

Application filed August 7, 1897. Serial No. 647,411. (No model.)

*To all whom it may concern:*

Be it known that I, JOHN LAWRENCE, a citizen of the United States, residing at Columbus, in the county of Franklin and State of Ohio, have invented certain new and useful Improvements in Beds, of which the following is a full and complete specification, such as will enable those skilled in the art to which it appertains to make and use the same.

This invention relates to beds; and the object thereof is to provide an improved device of this class which is particularly adapted for use by invalids, a further object being to provide a bed which is primarily designed for use in hospitals and other institutions of this class and the bed portion proper of which is made up of a plurality of separate sections which are mounted in the bed-frame or bedstead and which consists of a head-section, a seat-section, a leg-section, and a foot-section, the head-section being adapted to be raised in the direction of the seat-section, while the leg-section is adapted to be lowered, so as to support the legs of the patient when the head-section is raised; and with these and other objects in view the invention consists in the construction, combination, and arrangement of parts hereinafter described and claimed.

The invention is fully disclosed in the following specification, of which the accompanying drawings form a part, in which—

Figure 1:
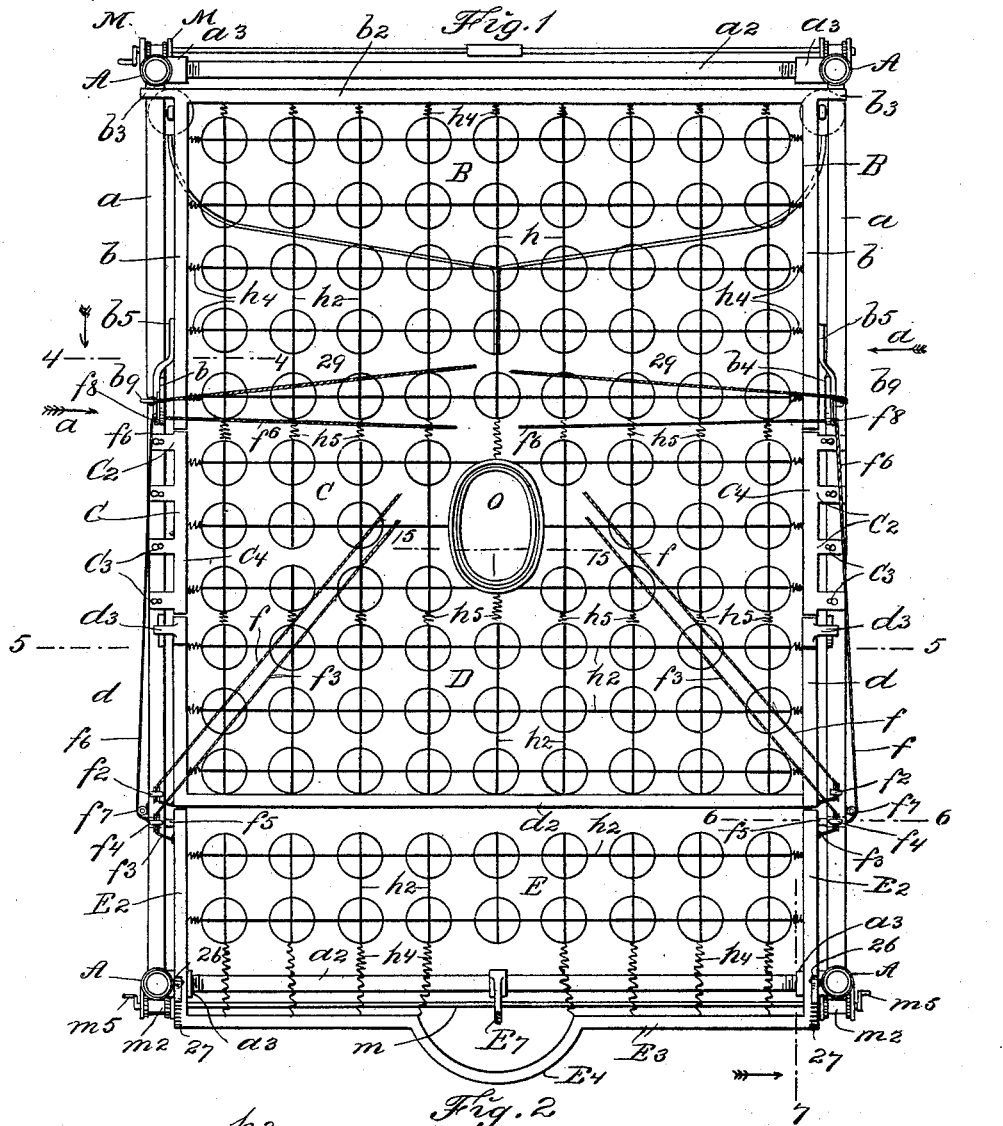
Figure 2:
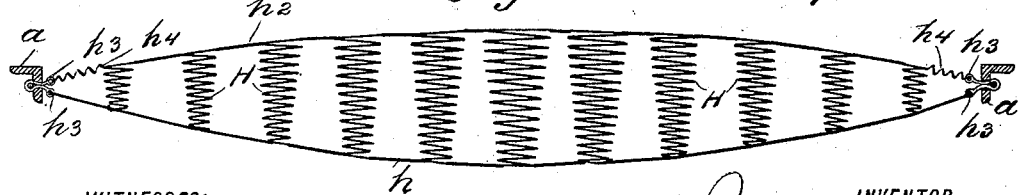

Figure 1 is a plan view of my improved bed; Fig. 2, a partial cross-section of the mattress, on an enlarged scale, and showing in said cross-section a number of springs greater than the number shown in Fig. 1; Fig. 3, a side view of a part of the bed, looking in the direction of the arrow $a$ of Fig. 1; Fig. 4, a section on the line 4 4 of Fig. 3; Fig. 5, a section of one side of the bed on the line 5 5 of Fig. 1; Fig. 6, a similar section on the line 6 6 of Fig. 1; Fig. 7, a section on the line 7 7 of Fig. 1; Fig. 8, a back view of one of the posts of the bedstead and the parts connected therewith; Fig. 9, a section on the line 9 9 of Fig. 8; Fig. 10, a side view of the bottom of said bed-post, showing a modified form of construction; Fig. 11, a side view of my improved bedstead complete; Fig. 12, an end view thereof, looking in the direction of the arrow $a$ of Fig. 11; Fig. 13, a view of the inside of one of the side bars of the bedstead and showing a part of the leg-section, said parts being on an enlarged scale; Fig. 14, an end view of the construction shown in Fig. 13, looking in the direction of the arrow 14; Fig. 15, a section on the line 15 15 of Fig. 1 and showing part of the mattress; Fig. 16, a similar view showing a modified form of construction; Fig. 17, a section on the line 17 17 of Fig. 15; Fig. 18, a plan view of a part of the construction shown in Fig. 15, with the mattress removed; Fig. 19, a view similar to Fig. 18, showing a modified form of construction; Fig. 20, a perspective view of my improved bed, showing the parts thereof in position to be used as a chair or reclining-seat and showing also a table connected therewith and the body portion of the foot-section being omitted, only the frame thereof being shown; and Fig. 21, an end view of the table-support which I employ.

In the drawings forming part of this specification the separate parts of my improvement are designated by the same letters and numerals of reference in each of the views, and in the practice of my invention I provide a bedstead which comprises the usual end posts A, and these posts are connected by side bars $a$ and by end bars $a^2$, and the side bars $a$ are preferably composed of angle-iron, as is also clearly shown in cross-section in Figs. 4, 5, and 6, and the end bars $a^2$ are preferably composed of hollow tubes, and these end bars $a^2$ are connected with the posts A by means of short tubular sections $a^3$, formed on or secured to said posts, and said end bars are provided at one or both ends with an annular row of perforations, as shown in Fig. 8, into which a wrench or similar instrument may be inserted, by means of which said end bars may be turned, and by means of this construction the width of the bed-frame may be adjusted as desired.

The body portion of the frame of the bed, which supports the mattresses and bedclothing, consists of four separate sections—a head-section B, a seat-section C, a leg-section D, and a foot-section E.

The head-section B consists of two side bars $b$, which are integrally connected at the end adjacent to the head end of the bedstead by a cross-bar $b^2$, which overlaps the side bars $a$, and the bed-frame is provided at the opposite sides thereof and adjacent to the point where the head-section B meets the seat-section C with an upwardly-directed semicircular plate $b^4$, and the side bars $b$ of the head-section B are also provided at each side with a plate $b^5$, which is secured thereto, as shown at $b^6$, and which is provided with an upwardly-directed projection $b^7$, and the upwardly-directed projection $b^7$ of the plate $b^5$ is provided with outwardly-directed shoulders or projections $b^8$, to which is pivoted a lever $b^9$, this construction being best shown in Figs. 3 and 4 and being the same on both sides of the bed, and pivotally connected with the lower end of the lever $b^9$ at $2^b$ is a pin $3^b$, and the plate $b^4$ is provided with a circular or segmental row of perforations $4^b$, and the pin $3^b$ passes through a corresponding hole in the plate $b^5$ and is adapted to enter any of the holes in the circular row $4^b$, and connected with the lower end of the lever $b^9$ is a spring 25, one end of which is connected with the upwardly-directed extension $b^7$ of the plate $b^5$.

The head-section B of the body of the bed-frame is pivotally connected with the plate $b^4$ at $5^b$, and by means of this construction the outer end of the head-section B may be raised or lowered on its pivotal supports at $5^b$ and may be locked in any desired position by means of the lever $b^9$ and the pin or bolt $3^b$, connected therewith, and pivoted to the plate $b^4$ at each side of the bedstead, as shown at $6^b$, is a lever $7^b$, one end of which projects in the direction of the head-section B and bears on a roller $8^b$, supported by an arm $9^b$, formed on or secured to the plate $b^5$, and the lever $7^b$ is a spring-lever, and the end thereof opposite the head-section B of the body of the bed-frame is provided with a pin 20, which is adapted to enter one end of a number of holes or perforations 21 in the plate $b^4$, said holes or perforations being formed in a segmental row, as clearly shown in Fig. 3, and in the normal position of these parts the free end of the lever $7^b$ bears on the roller $8^b$ and serves to assist in raising the free end of the head-section B of the body of the bed.

Mounted in the plate $b^5$ is a roller 22, which serves as an antifriction-roller and bears on the plate $b^4$ in the operation of raising and lowering the head-section B of the body of the bed-frame, and the seat-section C of the bed-frame is provided at each side with outwardly-directed lugs or projections $C^2$, which rest on the side $a$ of the bed-frame and are secured thereto by pins or bolts $C^3$. The said seat portion C consists of side strips or bars $C^4$ and the means by which they are connected, said means consisting of strips or wires, which are arranged transversely of the body of the bed and between which are placed the usual bed-springs, which will be hereinafter described.

The leg-section D of the body of the bed-frame consists of side bars $d$, which are connected adjacent to the foot-section by a cross-bar $d^2$, and the side bars $d$, adjacent to the seat-section, are provided with outwardly-directed arms $d^3$, having downwardly-directed extensions $d^4$, and the side bars $a$ of the bed-frame are provided with upwardly-directed extensions $d^6$ at each side, through which are passed a pivot pin or bolt $a^7$, which enters the downwardly-directed extensions $d^4$ of the arms, as shown at $d^5$, this construction being best shown in Fig. 5, and by means of this construction the leg-section D is adapted to drop downwardly on its pivotal supports at $d$.

The foot-section E of the body of the bed-frame consists of side bars $E^2$ and an end bar $E^3$, which is provided centrally with a backwardly-directed loop or bend $E^4$, and the rear portions of the side bars $E^2$ of the foot-section E pass over the end bars $a^2$ of the bedstead-frame, as shown in Fig. 7, and are connected therewith and adapted to turn thereon by means of yokes $E^5$, which are secured to the side bars $E^2$ of the foot-section E, and the said foot-section is provided at its inner end and at each side thereof with forwardly-directed plates $E^6$, (shown in dotted lines in Fig. 11 and in full lines in Fig. 20,) on which the free side or body portion of the leg-section D is adapted to rest when the said sections E and D are in their horizontal positions, this construction being best shown in Fig. 11, and connected centrally with the foot cross-bar $a^2$ of the bedstead and adapted to turn thereon is an arm or lever $E^7$, and secured to one side of the free end of the leg-section D of the body of the bed-frame is a cord $E^8$, which is carried upwardly and passed over a pulley $E^9$ and then downwardly and through a loop, staple, or other device F, secured to the arm or lever $E^7$, and then upwardly and over another pulley $E^9$ at the opposite side of the bed, and then downwardly and connected with the opposite side of the free end of the leg-section D, this cord being best shown in Figs. 11 and 12, and secured to the opposite side of the leg-section at the free ends thereof are cords $f$, which are passed up over, around, or through pulleys $f^2$, secured to the side bars $a$ of the bedstead, and corresponding cords $f^3$ are secured to the sides of the foot-section E at the free ends thereof and passed up over, around, or through pulleys $f^4$, secured to the top of the side bars $a$ of the bedstead-frame, and each of these cords $f$ and $f^3$ is carried forwardly and transversely of the bed or the seat-section thereof and is adapted to be operated by the occupant of the bed, as hereinafter described, to raise the leg-section and the foot-section successively into a horizontal position.

The sides or frame of the foot-section E, the leg-section D, the seat-section C, and the head-section B are all preferably composed of angle-iron, and in practice I also provide means for sustaining the foot-section and the leg-section in the horizontal position shown in Fig. 1, and these means consist of spring-operated bolts $f^5$, as shown in Fig. 6, with which are connected at each side a cord $f^6$, and these cords are carried outwardly through the side bars $a$ of the main bedstead and passed over, around, or through pulleys $f^7$, and carried forwardly and are passed inwardly through the plates $b^4$ and around rollers at $f^8$, mounted in said plates, these rollers being shown in Fig. 3, and in practice the ends of said cords $f^6$ are preferably connected and also adapted to be operated by the patient for the purpose of lowering the leg-section D and the foot-section E.

Pivoted to the inner sides of the side bars $a$ of the main bedstead directly beneath the pivotal point at $d^5$ of the leg-section, as shown at G, is a spring-lever $g$, the rear end of which bears on the under side of the sides $d$ of the leg-section and the forward end of which is provided with a hook $g^2$, with which is connected an elastic cord $g^3$, which is connected with a pin $g^4$, secured to a hanger $g^5$, which is connected with the bottom of the side bar $a$ of the main bedstead, this construction being the same on both sides, and the inner side of the sides $d$ of the leg-section are provided with angle-irons $g^6$, which are secured therein so as to form a bearing for the spring-lever $g$, this construction being best shown in Figs. 13 and 14, and the object of this construction is to provide means for allowing the leg-section or the free ends thereof to drop downwardly easily in the operation thereof, as hereinafter described.

The adjacent ends of the leg-section D and the foot-section E may be raised successively by the attendant by means of the lever $E^7$ or by pulling downwardly on said lever. The object of thus raising the leg-section before the foot-section is to allow the foot-section of the mattress, which is attached to the leg-section of the mattress, to pass upwardly to the level of the main bedstead before the foot-section of the bed, which must pass underneath, is raised. The leg-section has been previously shown to rest on the projections $E^6$ of the foot-section when in the horizontal position, and the foot-section is there secured by a spring-operated bolt $f^5$; but by means of the lever $E^7$, through the foot-section E, the leg-section D may be raised above the level of the bed to any desired angle and secured there by pawls 26, affixed to the tops of the posts A, which operate in connection with ratchet-heads 27 on the ends of the foot-section E at each side of the bedstead, thus allowing the foot-section of the mattress, in conjunction with the leg-section of the mattress, to suit the contour of the elevated leg and drooping ankle and foot and affording a very comfortable and easy position for the limbs of the patient when elevated. The leg-section may also be suspended alone at any angle by means of the lever $E^7$ and set-screws 28, used in connection with the pulleys $E^9$.

Connected with the upper ends of the levers $b^9$ are cords 29, by means of which the levers $b^9$ are operated, and these cords control the releasing of the head-section and pass over the bed, so as to be reached and operated by the occupant of the bed, and adjacent to these the cords $f^6$ are also carried across the bed and may also be controlled or operated by the occupant thereof, so as to control the releasing of the foot and leg sections. Both of these sets of cords are in easy reach of the patient, and pulling on these cords, while freeing both the head and the leg sections, aids the spring-lever $7^b$ in bringing the patient to a sitting position.

Each of the separate sections of the body portion proper of the bed or each of the sections B, C, D, and E is provided with springs H, which are supported on transverse strips $h$, as shown in Fig. 2, and the upper ends of which are provided with transverse strips $h^2$, and these transverse strips and wires $h$ and $h^2$ are connected with the sides of the separate sections of the bed, as indicated in Fig. 2, by yoke or V shaped clamps passed through the said sides and provided with eyes or rings $h^3$, with which the transverse strips or wires $h$ are connected, and the upper transverse wires or strips $h$ are connected with the said frame by elastic springs $h^4$, and the connections of the separate springs at the top may also be made in any desired manner, and it will be observed that the elastic spiral connections $h^4$ extend entirely around the body portion of the bed or around the separate sections thereof, both at the ends and sides; but the springs of the foot-section are in no way connected with the springs of the adjacent leg-section, while the springs of the head-section, the seat-section, and the leg-section are connected by elastic spiral springs, as shown at $h^5$, the object of this arrangement being to provide means for permitting the raising of the head-section and the lowering of the leg-section, as hereinbefore described, and it will be apparent that when the leg-section and foot-section are both lowered there is a separation of said sections and an open space between them, and by reason of this fact it is not possible to make connection between the springs of these sections, and it is also not desirable to have the springs underneath the foot when the patient is in a sitting position. The springs H are also arranged in a cross-section of the bed, as shown in Fig. 2, both the upper and the lower portion thereof being convex in cross-section, and although this is the form which I prefer it is not absolutely essential and the upper portion of the bed may be perfectly flat, as usual in this class of devices, if desired. It will also be observed that the tops of the springs H are connected by transverse and longitudinal wires or strips $h^2$, the longitudinal wires extending entirely over the head-section B, the seat-section C, and the foot-section D, while the bottoms of said springs are connected by transverse wires or strips $h$ and by longitudinal wires or strips which do not connect the springs of the separate sections, but which are divided along the division-lines of said sections, and the upper transverse wires $h^2$ may also be provided between each of said springs or alternately with short spiral springs similar to those at $h^5$.

The end posts A of the main bedstead are formed hollow, as shown in Fig. 9, and mounted in each is a vertically-movable supplemental tubular post K, in each of which is mounted a vertically-movable rod $k$, and the upper ends of these rods $k$ are connected or may be connected by detachable horizontal side rods $k^2$ and also by end rods $k^3$, and these horizontal side rods $k^2$ and the end rods $k^3$, connected with the upper ends of the vertically-movable rods $k$, are intended to support any form of curtains or a canopy for a bed.

I also provide a hammock-frame, which is supported by the vertically-adjustable supplemental tubular legs K, and this hammock-frame consists of rings or bands $k^5$, connected with the upper ends of said supplemental posts K by means of set-screws $k^6$ or in any desired manner, and these rings or bands are connected by end rods $k^7$, which are provided with inwardly and downwardly directed arms $k^8$, with which are connected supplemental end rods $k^9$, which are adjustably connected at L by a tubular coupling-head or by an ordinary turn-buckle, and the supplemental end rods $k^9$ are provided at their ends with swiveled sockets or rings $L^2$, by means of which horizontal side rods $L^3$ are supported, and the horizontal side rods $L^3$ constitute supports for the hammock, and any suitable hammock or a hammock of any suitable construction may be placed on and suspended or supported by these horizontal rods $L^3$.

Each of the legs A of the main bedstead is also provided with shoulders or projections M, and at each end of the bedstead is a shaft $m$, and between the shoulders or projections M at each of the end posts these shafts are provided with a drum $m^2$, and each of said drums is provided with a ratchet-wheel $m^3$ at each side thereof and a pawl $m^4$, which operates in connection therewith, and the said shaft $m$ is provided at one or both ends with a crank $m^5$, and wound on each of the drums $m^2$ in opposite directions are cords or steel ribbons $m^6$, one of which is connected with the upper end of the supplemental tubular post K, as shown at $m^7$, and the other with the lower end thereof, as shown at $m^8$, and said cords or ribbons are passed inwardly through the end posts $m^8$ of the main bed-frame and through a vertical slot formed in each, and mounted adjacent to the upper and lower end of said slots in each of said posts are small rollers N, and by manipulating the shafts $m$ at each end of the bedstead by means of the cranks $m^5$ the supplemental tubular posts K may be raised into the position shown in Fig. 11 or may be depressed, so as to raise either end of the bed separately or both ends of the bed at the same time, this being accomplished by reason of the fact that the corner-posts A of the main bed-frame are open at the bottom, and the supplemental tubular posts K bear on the floor, and each of the supplemental tubular posts K is preferably provided in its lower end with a roller $n$, and the supplemental tubular posts K may be provided with grooves or slots in which the cords or tapes $m^6$ will work.

In practice the end rods $k^7$ are usually always connected with the shafts of the supplemental posts K, and the supplemental end rods $k^9$ are also usually always connected with the rods $k^7$, but the side rods $L^3$ are not in position except when it is intended to use the hammock. This hammock may be used for any desired purpose for which hammocks are employed; but my improved hammock is particularly adapted for use to form a bed for the patient while the bed proper is being cleaned or aired or otherwise repaired, and the said hammock may be held at an angle, or one end thereof may be lowered and the other raised, and this is also true of the main bedstead.

I have also shown in Fig. 10 the lower end of one of the main corner-posts of the bedstead, and in this form of construction said lower end of said post is provided with a caster $n^2$, and this caster consists of a circular head $n^3$, provided with an arm, in which the roller $n^4$ is mounted, and the circular head or collar $n^3$ is held in place by a pin $n^5$, which is screwed to the post A.

The springs H are removed from the central portion of the seat-section C of the body of the bed, as shown in Fig. 15, and the top and bottom transverse strips $h$, between which said springs are placed, are also cut away, and formed therein is an elliptical or circular opening O, and supported by the bottom strips $h$, which support the springs H, is an annular plate $O^2$, in which are secured tubes $O^3$, into which extend from the lower ends thereof rods $O^4$, at the lower ends of which are projections $O^5$, and secured to the annular plate $O^2$ are spring-catches $O^6$, which engage with said projections, and the lower ends of said rods are provided with inwardly-directed extensions $O^7$, which engage with a central ring $O^8$, and mounted on the annular plate $O^2$, outside of the tubes $O^3$, is a spiral spring P, which rests on said plate and the upper end of which terminates beneath the opening O in the mattress.

Mounted concentrically within the spring P is a commode $P^2$, which is provided with a downwardly-directed neck $P^3$, which passes through the ring $O^8$, and around the base of said neck is formed an annular shoulder $P^4$, and mounted on the bars or rods $O^7$ is a supplemental spring $P^5$, the upper end of which bears on the lower side of said annular shoulder $P^4$. The upper end of the commode $P^2$ is open and provided with an annular or elliptical plate $P^6$, on which is placed an annular or elliptical pneumatic cushion $P^7$, which is composed of rubber or similar material, and said cushion may be secured to said annular plate $P^6$ in any desired manner, and connected with the cushion $P^7$, as shown in Fig. 18, are quadrant-shaped cushions $P^8$. When these cushions are inflated, the opening in the plate $P^6$ is closed, as shown in Figs. 15 and 18, and when said cushions are not inflated they contract, so as to open the top of the vessel or commode $P^2$, and these cushions may be composed of any desired material and may be inflated as hereinbefore described; and in Fig. 19 I have shown a modification of this construction, in which three of the cushions $P^8$ are used and which are all of slightly-different form than those shown in Fig. 18, and which may be inflated in the same manner as those shown in Fig. 18 and as hereinafter described.

I also provide a suitable vessel or receptacle R, which is provided with a neck $R^2$, which is provided at the top thereof with a rubber band $R^3$, with which is connected a sleeve $R^4$, which is connected with the lower end of the neck $P^3$ of the commode $P^2$ by another collapsible rubber band $R^5$, and the bottom of the neck $R^2$ of the vessel R is provided centrally with a tube $R^6$, which is supported by radial cross-bars $R^7$, and the tube $R^6$ is bell-shaped in form at both ends, and passing therethrough is a spring-rod $R^8$, which is provided at its upper end with spring-fingers $R^9$, which support a ball-valve $r$, said ball-valve being in practice simply placed between said fingers, and the lower end of the spring-rod $R^8$ is pivotally connected with one arm of the crank-lever $r^2$, which is pivotally supported in the vessel R at $r^3$ and with the other arm of which is pivotally connected at $r^4$ a rod $r^5$, which passes through a stuffing-box $r^6$, mounted in the side of the vessel R. By pulling outwardly on the rod $r^5$ the spring-rod $R^8$ will be drawn downwardly and the valve $r$ will drop into the neck of the commode and securely close the same; but by pushing inwardly on the rod $r^5$ this operation will be reversed and the valve $r$ will be raised into the position shown in Fig. 15 or higher and the neck of the commode will be opened and the contents thereof may pass into the vessel R, and said vessel R may be removed whenever desired, the connection between said vessel and the neck of the commode being made by means of the sleeve $R^4$ and the rubber bands $R^3$ and $R^5$.

It will be understood that the commode $P^2$ is always in position in the seat-section of the mattress and that said commode is supported by the springs P and $P^5$, and the spring $P^5$ and the commode may be moved downwardly whenever desired by releasing the spring-catches $O^6$.

It will be understood that the spring-rod $R^8$ is removed with the vessel R when the latter is removed, and said vessel R may rest upon the floor or upon any suitable support, and extending inwardly through the side of the commode and near the top thereof is a tube $r^7$, through which water may be passed to clean the same, and for this purpose a rubber tube may be connected with the pipe $r^7$ and with any suitable source of water-supply.

It will be understood that when the commode is in use the cushions $P^8$ are not inflated; but when it is not in use said cushions are inflated, as shown in Figs. 15, 18, 19, and 20, and constitute a part of the mattress, the opening O in which the commode is placed being formed in that portion of the mattress S which is connected with the seat-section C of the body portion of the bed.

In Fig. 16 I have shown a modification of this construction in which the commode $P^2$ consists of an ordinary cylindrical vessel, which is supported by the spring $P^5$, mounted on the cross-rod $O^7$, or a circular plate may be substituted for said cross-rod, and I also provide an annular plate $S^2$, which rests on the spring P and is affixed thereto, and mounted above said plate is an annular cushion $S^3$, which is provided with a central circular opening $S^4$ directly over the commode $P^2$, and the cushion $S^3$ is adapted to be inflated, and placed thereon is a supplemental pad $S^5$, which closes the upper portion of the opening O in the mattress and which also closes the opening $S^4$ in the cushion $S^3$, and which may be composed of the same material as the mattress S, and in this case the commode $P^2$ may be removed in the same manner as hereinbefore described with reference to Fig. 15, the springs $O^6$ operating to hold the said commode and the spring P in place.

The material of the circular cushion $P^7$ (shown in Fig. 15) and also of the circular cushion $S^3$ (shown in Fig. 16) underlaps and is secured to the board $P^6$ in Fig. 15 and $S^2$ in Fig. 16, and each case provides a bearing for the commode or the perimeter thereof, as will be readily understood and as clearly shown in said figures.

The operation of this form of construction will be readily understood from the foregoing description when taken in connection with the accompanying drawings, as will also the entire apparatus.

The head-section B of the body portion of the bed may be raised whenever desired, as hereinbefore described, and the leg-section at the same time lowered in order that the patient may set up in the bed, and in the operation of raising the bedstead at one end, as hereinbefore described, the shaft $m$ at that end is so operated as to force the supplemental tubular posts K downwardly, in which event the lower ends of said supplemental posts K, or the rollers $n$ mounted therein, will be pressed upon the floor and the tubular posts A will be raised, as will be readily understood; but in raising the posts K the shafts $m$ must be turned in the opposite direction. The rods $k$ may also be raised and adjusted in the supplemental tubular posts K, and may be held at any desired position by means of ordinary set-screws or similar devices, and by this arrangement the canopy hereinbefore described, which is adapted to be supported by the rods $k^2$ and $k^4$, may be held at any desired height above the bed or at any desired height above the hammock when the latter is in use.

In Fig. 20 I have shown the position which the parts of my improved bed occupy when the patient is sitting in an upright position or in a reclining position, and I have also shown a table which the patient may use when in this position, and in Figs. 11, 12, 15, 18, and 20 I have shown the means for inflating and deflating the pads $P^8$, which serve as a cushion and as a cover for the commode. This apparatus consists of pump-cylinders T, which are pivotally connected with the lower ends of the head-posts A of the bedstead, as shown at $T^2$, which project upwardly inside of the side bars $a$ thereof, and these pump-cylinders T are provided with piston-rods $T^3$, which are pivotally connected with the sides of the head-section B, as shown at $T^4$, and connected with the lower ends of the pump-cylinders T are rubber tubes $T^5$, which are carried upwardly and inwardly and connected with a valve-casing $T^6$, in which is placed a valve $T^7$, said casing being secured to the bottom of the head-section B of the bed, and extending from said valve-casing $T^6$ is a tube $T^8$, which is divided at $T^9$ to form two branch tubes U, which are carried upwardly and connected with yoke-shaped tubes $U^2$, which pass into the separate valves or pad-cushions $P^8$, and in this operation the yoke-shaped tubes $U^2$ are passed through the plate $P^6$, as shown in Fig. 15, and if the form of valves or cushions $P^8$ shown in Fig. 19 are employed it will be understood that three branch pipes only will be necessary, and in case this apparatus is used in connection with the construction shown in Fig. 16 the pipe U will communicate only with the circular cushion $S^3$; but it is not necessary to use this device in connection with the construction shown in Fig. 16, and in the operation of this device the raising of the head-section B into the position shown in Fig. 20 draws the air from and deflates the pads or cushions $P^8$, while the lowering of the head-section B reflates said pads or cushions $P^8$, as will be readily understood, it being also understood that the valves $T^7$ may be properly manipulated in order to accomplish this result. It will be apparent, however, that any other suitable means may be employed for inflating and deflating the valve pads or cushions $P^8$, and many other changes in and modifications of this form of construction may be made without departing from the spirit of my invention or sacrificing its advantages.

I have also shown in Fig. 20 a table W, which is supported by legs $W^2$, which pass through the side bars $a$ of the bedstead and are provided with vertical perforations $W^3$, and passed through said side bars $a$ of the bedstead are set-screws $W^4$, by means of which said legs $W^2$ are held in place and also all vertically adjustable. Connected with the bottom of the table at each end are transverse metal plates $W^4$, which are provided on their under sides with notches or recesses $W^6$, and secured to the ends of said plates are semicircular downwardly-directed plates $W^7$, in which are formed perforations or openings $W^8$, and passing through said semicircular plates $W^8$ are set-screws $W^9$, by means of which the table W may be adjusted laterally on the legs $W^2$.

It will be apparent that the table W may be moved laterally or transversely of the tops of the legs $W^2$, and said legs $W^2$ are provided on their upper ends with transverse wedge-shaped ends, which fit in the notches or recesses $W^6$ in the plates $E^4$.

It will be understood that when the patient is sitting on the seat-section C of the bed the table rests transversely across his lap and may be held at any desired height, and said table may be vertically adjustable and also laterally tilted at an inclination to the patient, and the table W may also be moved transversely of the top of the legs $W^2$, by which it is supported.

In Fig. 20 I have shown only the frame of the foot-section E, said frame consisting of the end rod $E^3$ and the side rods $E^2$, the spring body portion thereof being omitted, this being done in order to more clearly show the necessary features of construction to illustrate the operation of the bed, and in my improvement the separate sections of the mattress which are used in connection with the separate sections of the bed-frame proper are flexibly connected at the points where the said sections meet, and when the head-section B is raised, as shown in Fig. 20, that section of the mattress connected therewith is also raised, while the section of the mattress on the seat-section C remains stationary and the section of the mattress on the leg-section D drops downwardly, as shown in said figure, and the section of the mattress on the foot-section E is drawn off of the frame of the foot-section and rests upon the floor and serves as a cushion or support for the feet, and the separate sections of the mattress may be flexibly connected in any desired manner.

It will thus be seen that I accomplish the various objects of my invention by means of devices which are simple in construction and operation and which are well adapted to produce the result for which they are intended, and it will be apparent that my invention is not limited to the exact form of the apparatus herein described and the construction of the various parts thereof, as many modifications therein may be made.

Having fully described my invention, I claim as new and desire to secure by Letters Patent—

1. A bed consisting of a bedstead, comprising end posts, longitudinal side bars and end bars; said bed being provided with a body portion consisting of four separate sections or frames, a head-section, a seat-section, a leg-section, and a foot-section; said head-section being adapted to be folded forwardly and upwardly, and said leg-section being adapted to fold or drop downwardly, and the foot-section being pivotally connected with the foot of the bedstead, and adapted to drop downwardly, and a mattress also consisting of four separate sections, substantially as shown and described.

2. A bed consisting of a bedstead, comprising end posts, longitudinal side bars and end bars; said bed being provided with a body portion consisting of four separate sections or frames, a head-section, a seat-section, a leg-section and a foot-section, said head-section being adapted to be folded forwardly and upwardly, and said leg-section being adapted to fold or drop downwardly, and the foot-section being pivotally connected with the foot of the bedstead, and adapted to drop downwardly, and a mattress also consisting of four separate sections, the separate sections of the mattress being flexibly connected and adapted to fold so as to correspond with the movement of the head-section, and the leg-section, and that section of the mattress which rests upon the foot-section being adapted to be drawn off of the foot-section and to rest on the floor, substantially as shown and described.

3. A bed comprising a bedstead, and provided with four separate sections or frames consisting of a head-section, a seat-section, a leg-section and a foot-section, the head-section being hinged to the bedstead, and adapted to fold forwardly and the leg-section being also hinged to the bedstead and adapted to fold downwardly, and said foot-section being hinged to the foot of the bedstead and adapted to swing downwardly, substantially as shown and described.

4. A bed comprising a bedstead, and provided with four separate sections or frames consisting of a head-section, a seat-section, a leg-section, and a foot-section, the head-section being hinged to the bedstead, and adapted to fold forwardly and the leg-section being also hinged to the bedstead and adapted to fold downwardly, and said foot-section being hinged to the foot of the bedstead and adapted to swing downwardly, said head-section being provided with spring-levers which assist in raising the same, and also with pivoted side levers which are adapted to lock it in the lowered position, substantially as shown and described.

5. A bed comprising a bedstead, and provided with four separate sections or frames consisting of a head-section, a seat-section, a leg-section, and a foot-section, the head-section being hinged to the bedstead, and adapted to fold forwardly and the leg-section being also hinged to the bedstead and adapted to fold downwardly, and said foot-section being also hinged to the foot of the bedstead and adapted to swing downwardly, said head-section being provided with spring-levers which assist in raising the same, and also with pivoted side levers which are adapted to lock it in the lowered position, and said levers being provided with cords by which they may be operated and the leg and foot sections being also provided with cords and attaching devices by which they may be lowered or raised, substantially as shown and described.

6. A bed comprising a bedstead, and four separate sections connected therewith, said sections consisting of a head-section, a seat-section, a leg-section and a foot-section, said head-section being adapted to be folded forwardly and upwardly, and said leg-section downwardly, and the foot-section being pivotally connected with the foot of the bed and also adapted to swing downwardly, said sections being each provided with a section of a mattress, and said sections of the mattress being flexibly connected, and the foot-section of the mattress being secured to the leg-section thereof, substantially as shown and described.

7. A bedstead provided with four separate sections or frames, consisting of a head-section, a seat-section, a leg-section and a foot-section, said seat-section being held stationary, and provided with a central opening in which is placed a commode and said head-section being adapted to be raised forwardly and said leg-section to be folded downwardly, said head-section being also provided with locking-levers whereby it is locked in the lowered position, and with spring-levers which assist in raising it, and said leg-section being provided with cords which are secured to the opposite sides thereof, and which pass over pulleys mounted on the sides of the bedstead, and said leg-section being also provided with cords which are secured to the sides thereof, and which are passed over pulleys connected with the top of the foot-posts of the bedstead and provided with means for operating the same, substantially as shown and described.

8. A bedstead provided with four separate sections or frames, consisting of a head-section, a seat-section, a leg-section and a foot-section which is pivoted to the bedstead, said seat-section being held stationary, and said head-section being adapted to be raised forwardly and said leg-section to be folded downwardly, said head-section being also provided with locking-levers whereby it is locked in the lowered position, and with spring-levers which assist in raising it, and said leg-section being provided with cords which are secured to the opposite sides thereof, and which pass over pulleys mounted on the sides of the bedstead, and said leg-section being also provided with cords which are secured to the sides thereof, and which are passed over pulleys connected with the top of the foot-posts of the bedstead and provided with means for operating the same, and which is also adapted to operate the foot-section, substantially as shown and described.

9. A bedstead provided with four separate sections or frames, consisting of a head-section, a seat-section which is pivoted to the bedstead, a leg-section and a foot-section, said seat-section being held stationary, and said head-section being adapted to be raised forwardly and said leg-section to be folded downwardly, said head-section being also provided with locking-levers whereby it is locked in the lowered position, and with spring-levers which assist in raising it, and said leg-section being provided with cords which are secured to the opposite sides thereof, and which pass over pulleys mounted on the sides of the bedstead, and said leg-section being also provided with cords which are secured to the sides thereof, and which are passed over pulleys connected with the top of the foot-posts of the bedstead, and provided with means for operating the same, and which is also adapted to operate the foot-section, and said foot-section being also provided with cords which are connected with the pulleys secured to the sides of the bedstead and which extend forwardly, substantially as shown and described.

10. A bedstead constructed as herein described, and provided with a folding head-section, a stationary seat-section, and a folding leg-section and having a foot-section which is pivotally connected with the bedstead, said stationary seat-section being provided with a central opening, in which is placed a spring-supported commode, the bottom of which is provided with a neck with which is connected a detachable vessel or receptacle, said commode being also provided with a valve which is adapted to close said neck and to be operated, substantially as shown and described.

11. A bedstead constructed as herein described, and provided with a folding head-section, a stationary seat-section, and a folding leg-section, said stationary seat-section being also provided with a central opening in which is placed a spring-supported commode, the bottom of which is provided with a neck with which is connected a detachable vessel or receptacle, said commode being also provided with a valve which is adapted to close said neck and to be operated, and said commode being also provided with a pneumatic cushion or pad mounted on the top thereof, and with which are connected a plurality of quadrential and inflatable pads or cushions which are adapted to close the entrance to the commode, substantially as shown and described.

12. A bedstead constructed as herein described and provided with a folding head-section, a stationary seat-section, and a folding leg-section, said stationary seat-section being also provided with a central opening in which is placed a spring-supported commode, the bottom of which is provided with a neck with which is connected a detachable vessel or receptacle, said commode being also provided with a valve which is adapted to close said neck and to be operated, and said commode being also provided with a pneumatic cushion or pad mounted on the top thereof, and with which are connected a plurality of quadrential and inflatable pads or cushions which are adapted to close the entrance to the commode, and means for inflating said pads or cushions adapted to be operated by the movement of the head-section, substantially as shown and described.

13. A bed constructed as herein described, and provided with a stationary seat-section, and a head-section which is adapted to be raised, and a leg-section which is adapted to be lowered, said stationary seat-section being provided centrally thereof with a detachable spring-supported commode which is provided around the top thereof with a cushion or pad, said cushion or pad being also provided with inwardly-directed inflatable cushions or pads which are adapted to close the entrance to the commode, substantially as shown and described.

14. A bed constructed as herein described and provided with a stationary seat-section, a mattress mounted thereon, and provided with a central opening, a detachable spring-supported commode mounted in said section and extending upwardly partly through the mattress, a cushion mounted on the top of said commode, and provided with inwardly-directed inflatable cushions or pads which are adapted to close the entrance to said commode, said cushions or pads when inflated being flush with the top of the mattress, substantially as shown and described.

15. A bed constructed as herein described, and provided with a stationary seat-section, in the center of which is mounted a detachable commode, said seat-section being also provided with a mattress in the center of which is formed an opening into which the commode projects, and an annular or elliptical plate which rests on said commode, and on which is placed an annular or elliptical cushion or pad, said plate being also provided on its under side with a cover of rubber which rests on the commode and is integral with the cushion or pad, and said annular cushion or pad being also provided with inwardly-directed sectional cushions or pads which are inflatable so as to fill or close the opening into the commode, substantially as shown and described.

16. A bed constructed as herein described, and provided with a stationary seat-section, in the center of which is mounted a detachable commode, said seat-section being also provided with a mattress in the center of which is formed an opening into which the commode projects, and an annular or elliptical plate which rests on said commode, and on which is placed an annular or elliptical cushion or pad, said plate being also provided on its under side with a cover of rubber which rests on the commode and is integral with the cushion or pad, and said annular cushion or pad being also provided with inwardly-directed sectional cushions or pads which are inflatable so as to fill or close the opening in the commode, said detachable commode being also supported on springs, and being provided at its lower end with a neck which is adapted to be closed by a ball-valve and a detachable vessel or receptacle connected with the lower end of said neck and provided with means for operating said valve, substantially as shown and described.

17. A bed constructed as herein described and provided with separate sections, consisting of a folding head-section and stationary seat-section, a folding leg-section and a foot-section which is pivotally connected with the foot of the bedstead, and adapted to drop downwardly, said separate sections being also provided with sectional mattresses which are flexibly connected, and said seat-section being provided centrally thereof with an opening in which is placed a spring-supported commode which extends upwardly partly through a similar opening formed in that section of the mattress which is placed on the seat-section, said commode being provided at the top thereof with an annular cushion or pad with which are connected inflatable sectional cushions or pads which are adapted to close the entrance to the commode, substantially as shown and described.

18. A bed constructed as herein described and provided with separate sections, consisting of a folding head-section, and stationary seat-section, a folding leg-section and a foot-section which is pivotally connected with the foot of the bedstead, and adapted to drop downwardly, said separate sections being also provided with sectional mattresses which are flexibly connected, and said seat-section being provided centrally thereof with an opening in which is placed a spring-supported commode which extends upwardly partly through a similar opening formed in that section of the mattress which is placed on the seat-section, said commode being provided at the top thereof with an annular cushion or pad with which are connected inflatable sectional cushions or pads which are adapted to close the entrance to the commode, and means for inflating said inflatable cushions or pads consisting of air-pumps which are adapted to be operated by the folding head-section and which are in operative connection with said cushions or pads and tubes which connect said cushions or pads and the cylinders of said pumps, substantially as shown and described.

19. A bedstead provided with separate sections consisting of a head-section which is adapted to be folded upwardly and forwardly, a stationary seat-section, a leg-section which is adapted to be folded downwardly and a foot-section which is pivotally connected with or hinged to the foot of the bedstead, and adapted to drop downwardly, and means for holding the free end of the foot-section in a raised or horizontal position consisting of spring-operated bolts which are connected with the side bars of the bedstead and operated by cords passing therethrough, substantially as shown and described.

20. A bedstead provided with separate sections consisting of a head-section which is adapted to be folded upwardly and forwardly, a stationary seat-section, a leg-section which is adapted to be folded downwardly, and a foot-section which is pivotally connected with or hinged to the foot of the bedstead, and adapted to drop downwardly, and means for holding the free end of the foot-section in a raised or horizontal position consisting of spring-operated bolts which are connected with the side bars of the bedstead and operated by cords passing therethrough, said foot-section being also provided with means for supporting the free ends of the leg-sections in a horizontal position, substantially as shown and described.

21. A bedstead, the posts of which are hollow and provided with supplemental tubular posts which are mounted therein, said supplemental tubular posts being adapted to be forced downwardly so as to raise the bedstead or either end thereof, and also to be raised so as to form a support for a hammock, substantially as shown and described.

22. A bedstead the posts of which are hollow and provided with supplemental tubular posts which are mounted therein, said supplemental tubular posts being adapted to be forced downwardly so as to raise the bedstead or either end thereof, and also to be raised so as to form a support for a hammock, and said supplemental posts being also provided with vertically-movable rods which are mounted therein, and which are adapted to support a canopy, substantially as shown and described.

23. A bedstead, the main posts of which are hollow and provided with supplemental vertically-adjustable posts which are mounted therein, said main posts being provided with means for raising or lowering said supplemental posts, consisting of shafts connected with the ends of the main posts at each end of the bedstead, drums mounted thereon, and tapes or bands wound on said drum and connected with the upper and lower ends of said supplemental posts, substantially as shown and described.

24. A bedstead, the main posts of which are hollow and provided with supplemental vertically-adjustable posts which are mounted therein, said main posts being provided with means for raising and lowering said supplemental posts, consisting of shafts connected with the ends of the main posts at each end of the bedstead, drums mounted thereon, and tapes or bands wound on said drum and connected with the upper and lower ends of said supplemental posts, said tapes or bands being passed inwardly around pulleys mounted in said main posts adjacent to said drums and said drums being provided with ratchet-wheels and pawls which operate in connection therewith, substantially as shown and described.

25. A bedstead provided with tubular posts in which are mounted supplemental vertically-adjustable posts, means for raising and lowering said supplemental posts, and end rods and side rods connected with the upper ends of said vertically-adjustable supplemental posts and adapted to serve as supports for a hammock, said supplemental posts being also provided at their lower ends with rollers, substantially as shown and described.

26. A bedstead provided with tubular posts in which are mounted supplemental vertically-adjustable posts means for raising and lowering said supplemental posts, and end rods and side rods connected with the upper ends of said vertically-adjustable supplemental posts and adapted to serve as supports for a hammock, said vertically-adjustable supplemental posts being also provided at their lower ends with rollers, substantially as shown and described.

27. A bedstead provided with tubular posts in which are placed hollow vertically-adjustable supplemental posts mounted therein, vertically-adjustable rods mounted in said supplemental posts, hammock-supports connected with the upper end of said supplemental posts, and supports for a canopy connected with the upper ends of said rods, substantially as shown and described.

28. A bedstead constructed as herein described, and provided with a folding head-section, a stationary seat-section, a folding leg-section, said head-section being adapted to fold upwardly and forwardly, and said seat-section to fold downwardly, and a foot-section pivotally connected with the foot of the bedstead and adapted to fold downwardly, said bedstead being also provided with tubular posts in which are mounted vertically-adjustable supplemental posts, said supplemental posts being provided with means for supporting a hammock, substantially as shown and described.

29. A bedstead constructed as herein described, and provided with a folding head-section, a stationary seat-section, a folding leg-section, said head-section being adapted to fold upwardly and forwardly, and said seat-section to fold downwardly, and a foot-section pivotally connected with the foot of the bedstead and adapted to fold downwardly, said bedstead being also provided with tubular posts in which are mounted vertically-adjustable supplemental posts, said supplemental posts being provided with means for supporting a hammock, and said supplemental posts being also tubular in form and provided with vertically-adjustable rods which are adapted to support a canopy, substantially as shown and described.

30. A bedstead provided with separate sections consisting of a head-section, a seat-section, a leg-section and a foot-section, said head-section being adapted to fold upwardly, and forwardly, said leg-section to fold downwardly, and said foot-section being connected with the foot of the bedstead, and adapted to fold downwardly, each of said sections being also provided with mattress-springs, and the springs of the head-section, the seat-section and the leg-section being flexibly connected, substantially as shown and described.

31. A bedstead provided with separate sections consisting of a head-section, a seat-section, a leg-section and a foot-section, said head-section being adapted to fold upwardly, and forwardly, said leg-section to fold downwardly, and said foot-section being connected with the foot of the bedstead and adapted to fold downwardly, each of said sections being also provided with mattress-springs, and the springs of the head-section, the seat-section, and the leg-section being flexibly connected, and the springs of the seat-section being secured thereto, and adapted to fold therewith, substantially as shown and described.

32. A bedstead provided with separate sections consisting of a head-section, a seat-section, a leg-section and a foot-section, said head-section being adapted to fold upwardly, and forwardly, said leg-section to fold downwardly, and said foot-section being connected with the foot of the bedstead and adapted to fold downwardly, each of said sections being also provided with mattress-springs, and the springs of the head-section, the seat-section and the leg-section being flexibly connected, and the springs of the seat-section being secured thereto, and adapted to fold therewith, and said sections being also provided with a mattress which is composed of sections all of which are flexibly connected, substantially as shown and described.

33. A bed constructed as herein described, and provided with a folding head-section, a stationary seat-section, a folding leg-section and a foot-section which is pivotally connected with the foot of the bed, and adapted to fold downwardly, said head-section being adapted to fold upwardly and forwardly, and said leg-section downwardly, and said foot-section being provided with means for supporting the leg-section in a horizontal position, substantially as shown and described.

34. A bed constructed as herein described, and provided with a folding head-section, a stationary seat-section, a folding leg-section and a foot-section which is pivotally connected with the foot of the bed, and adapted to fold downwardly, said head-section being adapted to fold upwardly and forwardly, and said leg-section downwardly, and said foot-section being provided with means for supporting the leg-section in a horizontal position, the head-section, seat-section and leg-section being provided with a body portion and mattress-springs which are connected by transverse and longitudinal bottom strips, and transverse and longitudinal top wires or strips, these springs being flexibly connected transversely of the meeting-points of said head, seat and leg sections, substantially as shown and described.

35. A bed constructed as herein described and provided with a folding head-section, a stationary seat-section, a folding leg-section, and a foot-section, which is pivotally connected with the foot of the bed, and adapted to fold downwardly, said head-section, being adapted to fold upwardly and forwardly, and said leg-section downwardly, and said foot-section being provided with means for supporting the leg-section in a horizontal position, the head-section, seat-section, and leg-section being provided with a body portion and mattress-springs which are connected by transverse and longitudinal bottom strips, and transverse and longitudinal top wires or strips, these springs being flexibly connected transversely of the meeting-points of said head, seat and leg sections, and the foot-section being also provided with mattress-springs which are also connected by transverse and longitudinal bottom strips, and transverse and longitudinal top strips independently of the springs connected with the leg-section, substantially as shown and described.

36. A bed constructed as herein described, and provided with an upwardly-folding head-section, a stationary seat-section, a downwardly-folding leg-section, and a foot-section, pivotally connected with the foot of the bedstead and adapted to swing downwardly, each of said sections being also provided with a mattress, and all of said mattresses being flexibly connected, and said bedstead being also provided with a vertically-adjustable table which is mounted over the seat-section, substantially as shown and described.

37. A bed constructed as herein described and provided with an upwardly-folding head-section, a stationary seat-section, a downwardly-folding leg-section, and a foot-section pivotally connected with the foot of the bedstead and adapted to swing downwardly, each of said sections being also provided with a mattress, and all of said mattresses being flexibly connected, and said bedstead being also provided with a vertically-adjustable table which is mounted over the seat-section, said table being adapted also to be tilted laterally and moved longitudinally of the bedstead, substantially as shown and described.

38. A bedstead provided with the usual side bars, an upwardly-folding head-section, mounted therein, a stationary seat-section, a downwardly-folding leg-section, separate mattresses mounted on said sections and flexibly connected, said seat-section being also provided centrally thereof, with an opening which extends through the mattress, and a commode mounted in said seat-section which extends upwardly partly through the mattress mounted thereon, and means for closing said commode, said commode being also in communication at the bottom thereof with a detachable vessel the entrance of which is adapted to be closed, the bedstead being also provided with upwardly-directed portions with which are connected locking-levers by which the head-section is held in a raised position, substantially as shown and described.

39. A bedstead constructed as herein described, and provided with an upwardly-folding head-section, a stationary seat-section, a downwardly-folding leg-section, all of said sections being connected with the side bars of the bedstead and a foot-section pivotally connected with the foot of the bedstead and adapted to fold downwardly, said foot-section being provided at its opposite ends with forwardly-directed extensions which are adapted to support the free end of the leg-section, and means for operating said foot-section so as to raise the same and the leg-section above the horizontal level of the bedstead, substantially as shown and described.

40. A bedstead constructed as herein described and provided with an upwardly-folding head-section, a stationary seat-section, a downwardly-folding leg-section, all of said sections being connected with the side bars of the bedstead, and a foot-section pivotally connected with the foot of the bedstead, and adapted to fold downwardly, said foot-section being provided at its opposite ends with forwardly-directed extensions which are adapted to support the free end of the leg-section, and means for operating said foot-section so as to raise the same and the leg-section above the horizontal level of the bedstead, and said sides of the bedstead being provided with spring-levers which operate in connection with the leg-section so as to control the downward movement thereof, substantially as shown and described.

41. A bed provided with a folding head-section, a stationary seat-section provided with a central opening, and a folding leg-section together with a spring-bottom having an opening adapted to receive a commode, said bottom being composed of an elastic top fabric, and a non-elastic bottom fabric, and springs mounted between said fabrics, substantially as shown and described.

42. A bed provided with a spring-bottom having an opening adapted to receive a commode, said bottom being composed of an elastic top fabric, and a non-elastic bottom fabric, and springs mounted between said fabrics, said springs being larger at the center and smaller toward the sides, and both of said fabrics being connected with loops or yokes at the sides of the bed, substantially as shown and described.

43. A bed provided with a spring-bottom having an opening adapted to receive a commode, said bottom being composed of an elastic top fabric and a non-elastic bottom fabric, and springs mounted between said fabrics, said springs being larger at the center and smaller toward the sides, and both of said fabrics being connected with loops or yokes at the sides of the bed and said loops or yokes being passed through the side bars of the bedframe, and provided with eyes through which a cord may be passed, substantially as shown and described.

44. A bedstead provided with a spring-bottom, and a mattress each of which is provided with a corresponding opening adapted to receive a commode, a commode mounted in said opening and provided with an inflatable rubber seat around the opening in the mattress and flush with the surface of the mattress, and inflatable cushions which are adapted to be inflated and deflated in said opening, substantially as shown and described.

45. A bedstead provided with a spring-bottom, and a mattress mounted thereon, an opening formed in said spring-bottom and said mattress, a commode mounted in said opening and extending through said mattress, a frame mounted in the opening of the mattress against which the top of the commode bears, and an inflatable cushion or seat mounted on said frame, and flush with the surface of the mattress and means for closing the opening in the mattress, said commode being provided with spring-supports which force it against said frame, substantially as shown and described.

46. A bedstead provided with a spring-bottom, and a mattress mounted thereon, an opening formed in said spring-bottom and said mattress, a commode mounted in said opening and extending through said mattress, a frame mounted in the opening of the mattress against which the top of the commode bears, and an inflatable cushion or seat mounted on said frame, and flush with the surface of the mattress, said commode being provided with spring-supports which force it against said frame, and said cushion being also provided with inflatable pads which are adapted to close the opening into the commode, substantially as shown and described.

47. A bed provided with a bottom and a mattress mounted thereon, said mattress and said bottom being provided with an opening, a spring-supported commode mounted in said opening, and projecting partly through said mattress, said commode being provided with an inflatable cushion or seat, and means for closing the opening into said commode, substantially as shown and described.

48. A bedstead provided with a spring-bottom, as described and having a large oval or round opening formed therein, a mattress mounted on said spring-bottom, and provided with a corresponding opening, a spring-supported commode mounted in the opening in the spring-bottom, a plate fixed in the upper portion of the spring-bottom against which the commode is forced, said plate being provided with an inflated seat or cushion, and means for closing the opening into the commode, substantially as shown and described.

49. A bedstead provided with a bottom in which is formed an opening adapted to receive a commode, a commode set in said opening, and a detachable receptacle connected with the bottom thereof and in communication therewith, said commode being provided with a neck in which is placed a ball-valve, and said detachable receptacle being provided with means for operating said valve, and said receptacle being also provided with means for closing the same when detached from the commode, substantially as shown and described.

50. A bed constructed as herein described, and provided with a stationary seat-section, and in the center of which is mounted a detachable commode, provided with a neck at its lower end, a mattress for said seat-section provided with an opening in the center thereof into which the commode projects, an annular or elliptical plate which rests on said commode, an annular or elliptical cushion or pad mounted on said plate, a cover of rubber or similar material on the under side of said plate and resting on the commode, said cover being integral with the cushion or pad, said annular cushion or pad being also provided with inwardly-directed sectional cushions or pads which are inflated so as to fill or close the opening in the commode, springs for supporting said commode, a ball-valve for closing the neck thereof, and a detachable vessel or receptacle connected with the lower end of said neck and provided with means for operating said valve, consisting of a crank-lever pivotally supported in said vessel or receptacle, and provided with a spring-rod which passes up through said vessel or receptacle and through said neck, and which is provided at its upper end with spring-fingers which are adapted to receive said valve, and a rod which passes through the side of said vessel or receptacle, and is pivotally connected with said crank, substantially as described.

51. A bed constructed as herein described and provided with a plurality of separate sections, one of which constitutes a stationary seat-section, said seat-section being provided centrally with an opening, a spring-supported detachable commode mounted in said opening, a mattress mounted on said section and provided with a central opening into which the top of the commode projects, an annular or elliptical plate mounted on said commode, a rubber cushion which separates the commode from said plate and against which the commode is spring-pressed, inflatable cushions connected with said plate and adapted to close the entrance to the commode, said commode being provided with a downwardly-directed neck, and a ball-valve adapted to close the same, and a vessel or receptacle detachably connected with said neck and provided with means for operating said valve, substantially as described.

52. A bed constructed as herein described, and provided with a plurality of separate sections, one of which constitutes a stationary seat-section, said seat-section being provided centrally with an opening in which is mounted a spring-supported detachable commode, a mattress mounted on said section and provided with a central opening into which the top of the commode projects, an annular or elliptical plate mounted on said commode, a rubber cushion between said commode and said plate against which the commode is spring-pressed, inflatable cushions connected with said plate and adapted to close the entrance to the commode, said commode being also provided with a downwardly-directed neck, and a ball-valve which is adapted to close the same, a vessel or receptacle detachably connected with said neck and provided with means for operating said valve, said commode being also provided with means for washing or cleaning the same, and with inflating devices for said cushions or pads which are adapted to be operated, substantially as described.

53. A bedstead provided with a head-section, a seat-section, a leg-section, and a foot-section, the head-section being adapted to be folded upwardly and forwardly and the leg-section downwardly, said head-section being provided with locking-levers which are adapted to hold it in the lowered position, and with pivoted spring-levers, and rollers mounted on or connected with the head-section in connection with which said levers operate so as to assist in raising the same, the bed-frame at each side being provided with upwardly-directed parts or projections with which said spring-levers are connected, substantially as described.

54. A bedstead provided with a head-section, a seat-section, a leg-section, and a foot-section, the head-section being adapted to be folded upwardly and forwardly, and the leg-section downwardly, said head-section being provided with locking-levers which are adapted to hold it in the lowered position, and rollers mounted on or connected with the head-section, and pivoted spring-levers which operate in connection with said rollers so as to assist in raising said section, one end of said spring-levers being vertically adjustable on their supports, substantially as described.

55. A bed constructed as herein described and provided with separate body-sections consisting of a folding head-section, a stationary seat-section, a folding leg-section, and a folding foot-section which is pivoted to the bedstead, said head-section being adapted to be folded upwardly and forwardly, and the sides of the bedstead being provided with upwardly-directed plates with which said head-section is pivotally connected, said head-section being also provided with supplemental plates by means of which said connection is made, and antifriction-rollers connected with said supplemental plates which bear on the plates secured to the side bars of the bedstead, substantially as described.

56. A bed constructed as herein described and provided with separate body-sections, consisting of a head-section, a seat-section, a leg-section, and a foot-section, said head-section being adapted to be folded upwardly and forwardly, and the bedstead being provided with upwardly-directed plates formed on or secured to the side bars thereof with which said head-section is pivotally connected, said head-section being provided with supplemental plates by means of which said connection is made, antifriction-rollers connected with said supplemental plates which bear on the plates secured to the side bars of the bedstead, and spring-levers connected with said last-named plates which operate to raise the said head-section, and locking-levers by which said head-section is locked in the lowered or horizontal position, substantially as described.

57. A bed-frame consisting of the usual posts, side bars, and end rods or bars, said bed-frame being provided with a body portion composed of spiral springs which are larger at their upper than at their lower ends, a top fabric composed of metal wires or strips by which the upper ends of said springs are connected, and a bottom fabric composed of metal wires or strips by which the lower ends of said springs are connected, the ends of said metal wires or strips being connected with yokes or loops, substantially as described.

58. A bedstead provided with a spring-bottom composed of an upper and lower fabric or network, and spiral springs between said fabrics, said spring-bottom being provided with a large circular or oval opening, and a large spiral spring placed in said opening between the upper and lower fabric, and a commode supported by said spring, substantially as described.

59. A bedstead provided with a spring-bottom composed of an upper and lower fabric or network, and spiral springs placed between said upper and lower fabrics or networks, said bottom being also provided with a large circular or oval opening, and a large spiral spring placed in said opening between the upper and the lower fabrics, and a commode supported by said spring, said spring being supported by a ring connected with the lower fabric, substantially as described.

60. A bedstead provided with a spring-bottom composed of an upper and a lower fabric or network, and spiral springs placed between the same, said bottom being also provided with a large circular or oval opening, and a large spiral spring placed in said opening between said upper and lower fabrics, a commode supported by said spring, a ring by which said spring is supported, said ring being connected with the lower fabric, and a vertically-movable support mounted in said ring on which the commode rests, substantially as described.

61. A bedstead provided with a spring-bottom composed of an upper and lower fabric or network, and spiral springs placed between said upper and lower fabrics, said bottom being also provided with a large circular or oval opening, a large spiral spring placed in said opening between said upper and lower fabrics, a ring connected with the lower fabric by which said spring is supported, and a vertically-movable commode-support connected with said ring, said support being provided with spring-catches for holding the commode in position, substantially as described.

62. A bedstead provided with a spring-bottom composed of an upper and lower fabric or network, a large spiral spring placed in said opening between said upper and lower fabrics, a ring connected with the lower fabric by which said spring is supported, and a vertically-movable commode-support mounted in said ring, said support being provided with spring-catches for holding it in a raised position, and also with a supplemental spring on which said commode rests, substantially as described.

63. A bedstead the main posts of which are hollow and provided with supplemental vertically-adjustable posts which are mounted therein and which are adapted to be projected from the upper and lower ends thereof, said main posts being provided with means for raising and lowering said supplemental posts, consisting of shafts connected with the ends of the main posts at each end of the bedstead, drums mounted thereon, and tapes or bands wound on said drums and connected with the upper and lower ends of said supplemental posts, said tapes or bands being passed inwardly around pulleys mounted in said main posts adjacent to said drums, and said drums being provided with ratchet-wheels, and pawls which operate in connection therewith, and said supplemental posts being adapted to serve as supports for a hammock, substantially as described.

64. A bedstead, the posts of which are hollow, and provided with supplemental tubular posts which are mounted therein and vertically movable, said supplemental tubular posts being adapted to be forced downwardly so as to raise the bedstead or either end thereof, and the lower ends of said supplemental tubular posts being provided with rollers, and the upper ends thereof being also adapted to be raised above the main posts, and provided with means for supporting a hammock, substantially as shown and described.

In testimony that I claim the foregoing as my invention I have signed my name, in presence of the subscribing witnesses, this 4th day of August, 1897.

JOHN LAWRENCE.

Witnesses:
C. GERST,
L. M. MULLER.